United States Patent
Arndt et al.

(10) Patent No.: US 12,474,688 B2
(45) Date of Patent: Nov. 18, 2025

(54) CONTROLLING A SYNTHESIS PROCESS

(71) Applicant: BASF SE, Ludwigshafen am Rhein (DE)

(72) Inventors: Matthias Arndt, Ludwigshafen (DE); Holger Kai Peter Jelich, Ludwigshafen (DE); Thomas Soltys, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 481 days.

(21) Appl. No.: 18/018,757

(22) PCT Filed: Jul. 29, 2021

(86) PCT No.: PCT/EP2021/071327
§ 371 (c)(1),
(2) Date: Jan. 30, 2023

(87) PCT Pub. No.: WO2022/023495
PCT Pub. Date: Feb. 3, 2022

(65) Prior Publication Data
US 2023/0305519 A1 Sep. 28, 2023

(30) Foreign Application Priority Data
Jul. 31, 2020 (EP) .................................... 20188937

(51) Int. Cl.
*G05B 19/4063* (2006.01)
*G05B 19/418* (2006.01)
*G16C 20/10* (2019.01)

(52) U.S. Cl.
CPC ... *G05B 19/4063* (2013.01); *G05B 19/41865* (2013.01); *G16C 20/10* (2019.02)

(58) Field of Classification Search
CPC .......... G05B 19/4063; G05B 19/41865; G16C 20/10
See application file for complete search history.

(56) References Cited

U.S. PATENT DOCUMENTS

| | | | |
|---|---|---|---|
| 7,369,913 B2 | 5/2008 | Heminway et al. | |
| 2005/0065626 A1 | 3/2005 | Kappelhoff et al. | |
| 2015/0105885 A1 | 4/2015 | Grove et al. | |

FOREIGN PATENT DOCUMENTS

| | | |
|---|---|---|
| EP | 3206096 A1 | 8/2017 |
| WO | 2007/017738 A2 | 2/2007 |

OTHER PUBLICATIONS

European Search Report for EP Patent Application No. 20188937.5, Issued on Jan. 11, 2021, 3 pages.

(Continued)

*Primary Examiner* — Gary Collins
(74) *Attorney, Agent, or Firm* — ArentFox Schiff LLP

(57) ABSTRACT

A computer implemented method for controlling a synthesis process for a chemical or biological product, comprising the steps of at a processing device of a synthesis specification control module receiving via a communication interface a synthesis specification for the synthesis process, deriving a set of experimental requirements from the synthesis specification, receiving via the communication interface device laboratory equipment data associated with at least one laboratory equipment device deriving a set of equipment properties from the laboratory equipment data associated with at least one laboratory equipment device, comparing the set of experimental requirements with the set of equipment properties, generating control data based on the comparison providing with the processing device the control data suitable for controlling the synthesis process.

18 Claims, 5 Drawing Sheets

(56) References Cited

OTHER PUBLICATIONS

Figure 1:
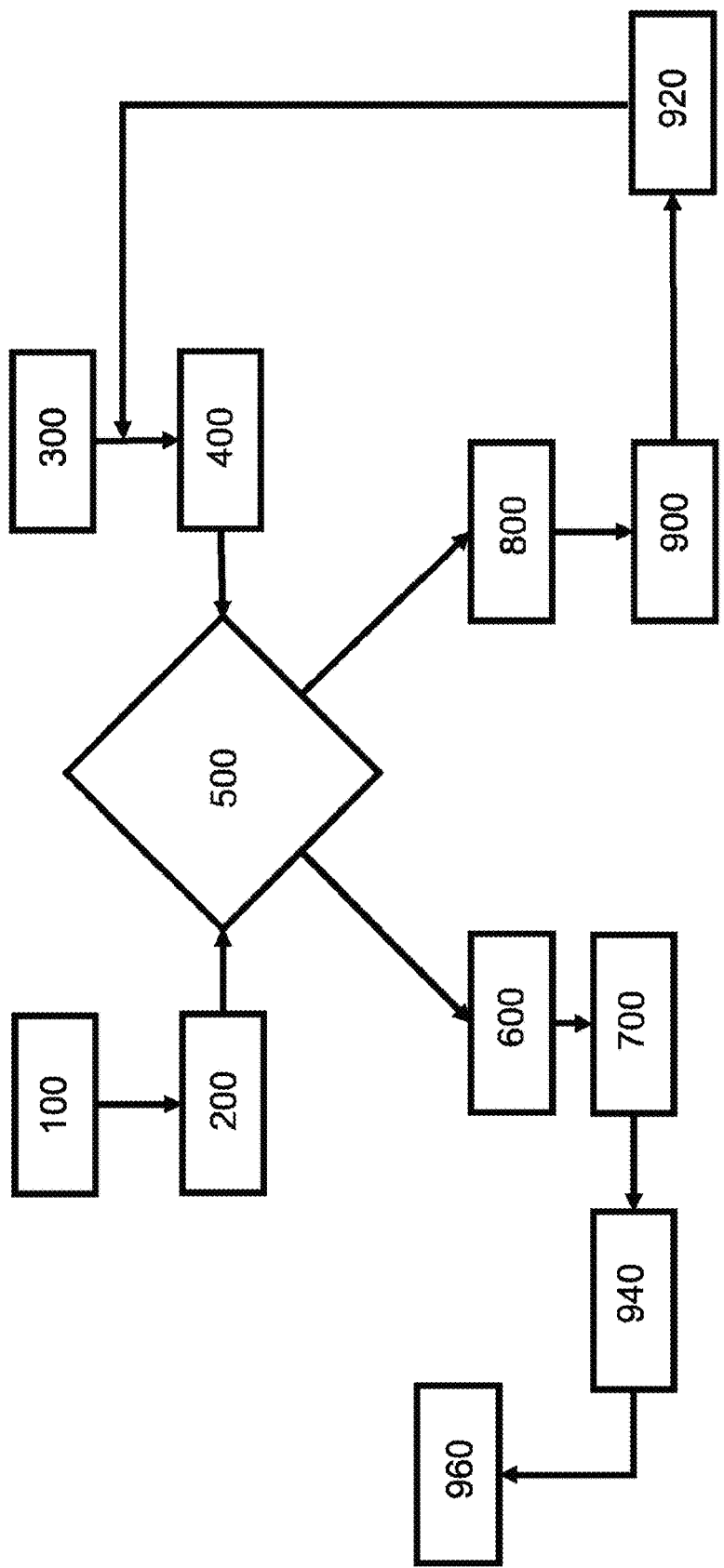

International Search Report for PCT Patent Application No. PCT/EP2021/071327, Issued on Nov. 4, 2021, 3 pages.
Viswanathan, et al., "Automating operating procedure synthesis for batch processes: Part II. Implementation and application", Computers & Chemical Engineering, vol. 22, Issue 11, Oct. 15, 1998, pp. 1687-1698.

CONTROLLING A SYNTHESIS PROCESS

CROSS-REFERENCE TO RELATED APPLICATIONS

This application is a National Stage Entry of PCT/EP2021/071327, filed Jul. 29, 2021, which claims priority to European Application No. 20188937.5, filed Jul. 31, 2020, the disclosures of each of which are hereby incorporated by reference in their entirety.

FIELD

The present disclosure relates to systems, methods and computer program products for controlling and/or monitoring a synthesis process for chemical or biological products.

BACKGROUND

In chemical industries laboratory experiments are an essential part in daily work. Chemists plan synthesis processes and propose synthesis specifications. The synthesis process is then run by experimentalists that are not necessarily chemists. For a synthesis process the experimentalists need to evaluate the synthesis specification. Then the necessary equipment needs to be allocated and set up in the appropriate order, in addition to that the equipment needs to be configured. All these steps are time consuming and tedious, therefore there is a need for a more efficient and safer way of executing synthesis processes.

SUMMARY

Proposed is computer implemented method for controlling and/or monitoring a synthesis process for a chemical or biological product, comprising the steps of
at a processing device of a synthesis specification control module
receiving via a communication interface a synthesis specification for the synthesis process,
deriving a set of experimental requirements from the synthesis specification,
receiving via the communication interface device laboratory equipment data associated with at least one laboratory equipment device
deriving a set of equipment properties from the laboratory equipment data associated with at least one laboratory equipment device,
comparing the set of experimental requirements with the set of equipment properties,
generating control data based on the comparison,
providing with the processing device the control data suitable for controlling the synthesis process.

The term synthesis specification of a synthesis process may relate to a recipe for a synthesis of a chemical or biological product. The term recipe and synthesis specification may be used synonymously. A synthesis specification may comprise information related to ingredients of the synthesis process and instructions for the synthesis process. The instructions may be computer executable instructions. This allows automatic execution of the synthesis specification by the laboratory equipment devices.

Receiving at the processing device a synthesis specification for a synthesis process may include receiving the synthesis specification from an input device. The input device may comprise a physical interface (e.g. a keyboard, a touch screen, a computer mouse, etc. or a logical interface (e. g. computer interface to a database, a wired or wireless interface to a computer or a computer network, etc.).

A synthesis specification for a synthesis process in chemical industries may describe a set of instructions how to get from at least one reactant to at least one product. The synthesis specification for a synthesis process may be a description of several process steps required to get from the at least one reactant to the at least one product.

The synthesis specification for the for a synthesis process in chemical industries may comprise a list of chemical components to be used. The plan may comprise a sequence of process steps. The plan may comprise instructions, such as (e.g. heating, cooling, mixing, dosing, pressure changing). The synthesis specification may comprise time stamps for ordering the instruction steps. A synthesis specification may also comprise a chronological order e.g. along a time axis, that defines at what point in time each process step is performed and also the time period how long a certain process step is performed. The synthesis specification may further comprise for each functional requirement a unique set point at each point in time. In an example, this may be a set rotational speed for a mixer, or a temperature set point for a heater. The technical requirement derived from a synthesis specification may be a maximum of all set points for a functional requirement.

In an aspect the method may further comprise the step of requesting the laboratory equipment data associated with the at least one laboratory equipment device from said at least one laboratory equipment device.

This allows direct communication with the laboratory equipment devices and prevents user errors. Furthermore, this allows safer execution of the synthesizing process.

The method may further comprise the step of selecting a synthesis specification from stored preconfigured synthesis specifications. This allows efficient control of the synthesis processes. Selection of stored preconfigured synthesis specifications reduces the risk of entering inconsistent synthesis specifications. It also enables a more efficient use of the laboratory resources.

In an aspect, the step of providing the control data may further comprise providing control data indicating that the set of equipment properties meet the set of experimental requirements from the synthesis specification, or providing control data indicating that the set of equipment properties does not meet the set of experimental requirements from the synthesis specification.

This may be understood as a step of dependent on the comparison via an output device providing with the processing device control data that indicates that the set of equipment properties from the laboratory equipment data associated with the at least one laboratory equipment device meet the set of experimental requirements from the synthesis specification or providing with the processing device control data that indicates that the set of equipment properties from the laboratory equipment data associated with the at least one laboratory equipment device are not meeting the set of experimental requirements.

The step dependent on the comparison via an output device, providing with the processing device control data that indicates that the set of equipment properties from the laboratory equipment data associated with at least one laboratory equipment device meet the set of experimental requirements from the synthesis specification or providing with the processing device control data that indicates that the set of equipment properties from the laboratory equipment data associated with at least one laboratory equipment device are not meeting the set of experimental requirements from the synthesis specification allows an easy determination whether the equipment is suitable for executing the synthesis specification.

This is advantageous because it reduces the risk of performing an experiment synthesis process that is not capable of successfully performing the synthesis process. This reduces the resource invest in synthesis processes and also increases safety.

When the control data indicating that the set of equipment properties meet the set of experimental requirements from the synthesis specification the control data may comprise a control signal for executing the synthesis process.

This enables efficient control of the synthesis process. In an aspect the at least laboratory device is configured to receive the control signal for starting the synthesis process. In an aspect the control data comprises control parameters of the synthesis specification. Control parameters of a synthesis may comprise reducing resources for the synthesis process.

The set of experimental requirements derived from the synthesis specification relates to requirements that need to be fulfilled for successfully running a synthesis process according to the synthesis specification.

Deriving the set of experimental requirements from the synthesis specification, may comprise:
  deriving a set of functional requirements from the synthesis specification,
  deriving a set of technical requirements from the synthesis specification.

The set of functional requirements derived from the synthesis specification may be functions that are required at a certain process step in the synthesis specification.

The set of functional requirements may comprise e. g. weighing, mixing, pumping, heating, cooling, temperature controlling, pressure controlling, measuring of volumes, control logics such as automated pH control or any other inline analytics.

The set of technical requirements derived from the synthesis specification may be technical requirements that need to be achieved for performing the process step in the synthesis specification. The set of technical requirements may comprise e.g. temperatures, flow rates, heating rates, cooling rates, mixer speed/torque, pressure.

Deriving a set of equipment properties from the laboratory equipment data associated with at least one laboratory equipment device, may comprise
  deriving a set of equipment functions from the laboratory equipment data associated with at least one laboratory equipment device,
  deriving a set of equipment function capabilities from the laboratory equipment data associated with at least one laboratory equipment device.

The set of equipment properties derived from the laboratory equipment data associated with at least one laboratory equipment device relates to physical or logical properties of equipment contained on the laboratory equipment data associated with at least one laboratory equipment device.

The separation between equipment functions and equipment capabilities allows more efficient assignment of laboratory equipment to the setup of synthesis processes. Equipment may now be selected, such that the needed number of functional requirements is met with the smallest set of equipment devices.

The set of equipment functions derived from the laboratory equipment data associated with at least one laboratory equipment device may relate to functions that can be performed by the equipment on the laboratory equipment data associated with at least one laboratory equipment device. A piece of equipment may have one function or multiple functions.

Multiple functions may be more than one function, more specific two or more functions, more specific three or more functions. The equipment functions may comprise e. g. weighing, mixing, pumping, heating, cooling, temp controlling, pressure controlling, measuring, control logics such as automated pH control or any other inline analytics. An example of a piece of equipment having two functions a heater/mixer device such as a hotplate/stirrer combination.

The set of equipment function capabilities derived from the laboratory equipment data associated with at least one laboratory equipment device may relate to available capabilities for each of the functions available from the equipment. The set of equipment function capabilities may comprise e.g. min and/or max. temperature, min and/or max. flow rate, min and/or max. heating rate, min and/or max. cooling rate, min and/or max. mixer speed/torque, min and/or max. pressure, a temperature range, a flow rate range, a heating rate range, a cooling rate range, a mixer speed/torque range, a pressure range.

The processing device may be a processor. The processing device may be more than one processor or a network of processors. Each of the input and output devices may comprise a separate processor or one processor may control each of the input and output devices.

Comparing via a processing device the set of experimental requirements with the set of equipment properties has the advantage that the comparison does not require a human interaction.

In an aspect comparing via the processing device the set of experimental requirements with the set of equipment properties, may comprise
  comparing the set of functional requirements with the set of equipment functions
  comparing the set of technical requirements with the set of equipment function capabilities.

Comparing the set of functional requirements with the set of equipment functions via the process device may comprise assessing whether for each functional requirement of the set of functional requirements at least a corresponding equipment function is available in the set of equipment functions. When for each functional requirement of the set of functional requirements a corresponding equipment function is available in the set of equipment functions, it is considered that set of equipment functions meet the set of functional requirements.

Comparing the set of technical requirements with the set of equipment function capabilities may comprise assessing whether each of the technical requirements lies within respective range of equipment function capabilities. Laboratory equipment often provide a physical range, for example a heater may provide the maximum temperature that can be achieved. In that case identifying whether the technical requirement is within the range of the heater can be understood as a simple comparison: temperature requirement from the synthesis specification <max temperature of the technical equipment. When the set of technical requirements lies within the range of the set of equipment function capabilities, it is considered that the set of technical requirements meet the set of equipment function capabilities.

In an aspect providing control data comprises providing
  control data indicating that the set of equipment functions meet the set of functional requirements, and the set of equipment function capabilities meet the set of technical requirements or providing with the processing device control data indicating that the set of equipment functions are not meeting the set of functional requirements, and/or the set of equipment function capabilities are not meeting the set of technical requirements.

The step dependent on the comparison via an output device providing with the processing device control data that indicates that the set of equipment properties from the laboratory equipment data associated with at least one laboratory equipment device meet the set of experimental requirements from the synthesis specification may comprise providing control data that indicates that the set of equipment functions meet the set of functional requirements, and the set of equipment function capabilities meet the set of technical requirements or providing with the processing device control data that indicates that the set of equipment properties from the laboratory equipment data associated with at least one laboratory equipment device are not meeting the set of experimental requirements from the synthesis specification may comprise providing control data that indicates that the set of equipment functions are not meeting the set of functional requirements, and/or the set of equipment function capabilities are not meeting the set of technical requirements.

The step of providing the synthesis specification via an input device provides high flexibility in changing synthesis specifications for experiments. In chemical industry production new products are constantly developed or existing production processes are reevaluated in labs. Therefore, synthesis specifications for experiments are frequently changed.

Additionally, or alternatively the step of providing the synthesis specification may comprise manually entering the synthesis specification. Manually entering the synthesis specification is advantageous if a new synthesis specification has recently been developed and should be tested for the first time.

Additionally, or alternatively the step of providing the synthesis specification may comprise retrieving the synthesis specification from a synthesis specification database. Retrieving the synthesis specification from the synthesis specification database is in particular useful, if the synthesis specification has been previously developed.

The step of deriving a set of functional requirements from the synthesis specification adds an abstraction layer that allows easy comparison of the functional requirements with equipment functions. The step of deriving a set of functionalities from the synthesis specification has the advantage that generic comparable parameters are generated that can then be further processed in laboratory automation.

The step of deriving the set of technical requirements from the synthesis specification adds an abstraction layer that allows easy comparison the set of technical requirements from the synthesis specification with the technical equipment function capabilities. The step of deriving a set of technical requirements from the synthesis specification has the advantage that generic comparable parameters are generated that can then be further processed in laboratory automation.

Separating functional requirements and technical requirements allows more flexibility in describing a synthesis specification. Furthermore, it allows a more efficient use of laboratory resources, such resources may be laboratory devices.

The step of providing via the input device the laboratory equipment data associated with at least one laboratory equipment device provides high flexibility in assessing laboratory equipment.

The laboratory equipment data associated with at least one laboratory equipment device may be a list of laboratory equipment that is currently installed and/or configured in a lab. The laboratory equipment data associated with at least one laboratory equipment device may also be an empty list, this is particularly useful if no laboratory equipment is currently installed and/or configured.

Alternatively, or additionally the laboratory equipment data associated with at least one laboratory equipment device may be a list of equipment available in an inventory of the lab.

Alternatively, or additionally the laboratory equipment data associated with at least one laboratory equipment device may be a list of equipment available in an inventory list of a company.

Additional equipment may also easily be added by amending the laboratory equipment data associated with at least one laboratory equipment device.

Additionally, or alternatively the step of providing the laboratory equipment data associated with at least one laboratory equipment device may comprise manually entering the list of laboratory equipment. Manually entering the laboratory equipment data associated with at least one laboratory equipment device is advantageous when new equipment is added. Manually entering the laboratory equipment data associated with at least one laboratory equipment device is advantageous when the list of laboratory equipment relates to equipment that is currently installed and/or configured in the lab.

Additionally, or alternatively the step of providing the laboratory equipment data associated with at least one laboratory equipment device may comprise retrieving the laboratory equipment data associated with at least one laboratory equipment device from an equipment database. Loading the laboratory equipment data associated with at least one laboratory equipment device from the equipment database is in particular useful, if the laboratory equipment data associated with at least one laboratory equipment device relates to equipment available in an inventory of the laboratory or equipment available in an inventory list of a company.

The laboratory equipment data associated with at least one laboratory equipment device may comprise brand names and/or device names of the laboratory equipment.

The step of deriving a set of equipment functions from the laboratory equipment data associated with at least one laboratory equipment device adds an abstraction layer that allows easy comparison of the functional requirements with the equipment functions. This generalizes the devices and provides that generic comparable parameters are generated that can then be further processed in laboratory automation. This abstraction layer also allows to consider that one piece of equipment may have one function or multiple functions. Magnetic stirrers for example often have also a heater functionality build in.

The step of deriving a set of equipment function capabilities from the laboratory equipment data associated with at least one laboratory equipment device adds an abstraction layer that allows easy comparison the set of technical requirements from the synthesis specification with the technical equipment function capabilities. This generalizes the devices and provides that generic comparable parameters are generated that can then be further processed in laboratory automation.

Separating equipment functions and equipment function capabilities allows more flexibility in describing the equipment.

The step of comparing via a processing device the set of functional requirements with the set of equipment functions, allows to determine if all required functions can be performed when using equipment from the provided laboratory equipment data associated with at least one laboratory equipment device. This prevents choosing equipment for a setup that cannot perform all required functions of the synthesis specification. For example, if a functional requirement in the synthesis specification calls for a heater then the step of comparing reveals whether a piece of equipment that provided a heater function is present in the laboratory equipment data associated with at least one laboratory equipment device.

The step of comparing via a processing device the set of technical requirements with the set of equipment function capabilities, allows to determine whether the set of technical requirements can be fulfilled. This prevents choosing equipment for a setup that cannot perform all required functions of the synthesis specification. For example, if the technical requirement calls for a heater providing a temperature of 100° C., then the step of comparing reveals whether any of the heaters of the laboratory equipment data associated with at least one laboratory equipment device is capable for providing a temperature of 100° C.

The step of providing dependent on the comparison with the processing device the control data that indicates that the set of functionalities and the requirements of the synthesis specification are met may comprise providing the control data to the user. This has the advantage of providing feedback to an experimentalist that all equipment necessary for running the planned experiment.

Alternatively, or additionally the step of providing dependent on the comparison via an output device the control data that indicates that the set of functionalities and the requirements of the synthesis specification are met may comprise providing a triggering further method steps. This adds more flexibility to the method and may even allow to fully automize experiments The step of providing dependent on the comparison via an output device the control data that indicates that the set of equipment functions are not meeting the set of functional requirements, and/or the set of equipment function capabilities are not meeting the set of technical requirements may comprise providing the control data to the user. This has the advantage of providing feedback to a experimentalist that all equipment necessary for running the planned experiment.

Alternatively, or additionally the step of providing dependent on the comparison via an output device the control data that indicates that the set of equipment functions are not meeting the set of functional requirements, and/or the set of equipment function capabilities are not meeting the set of technical requirements may comprise triggering further method steps. This adds more flexibility to the method and may even allow to fully automize a setup workflow for setting up planned experiments.

In one aspect the synthesis specification may be provided in a predefined format. A predefined format allows more reliable deriving the set of functional requirements from the synthesis specification and the set of technical requirements from the synthesis specification. Examples of predefined synthesis specification s may comprise e.g. tables, structured text formats. Suitable structured text formats may be JSON files or JSON type files.

In an aspect the step of deriving a set of experimental requirements from the synthesis specification may additionally or alternatively comprise deriving arrangement requirements. The arrangement requirement reflects how the functionalities need to be arranged to reflect the process flow of the experiment.

Arrangement requirements may be understood as a certain order of functionalities that is needed for executing the synthesis specification. For example, a pump for transferring a fluid into a vessel needs to be arranged before the vessel to perform the task of transferring fluid into the vessel.

The use of arrangement requirements allows to more precisely reflect the workflow of the synthesis specification.

Additionally, or alternatively the arrangement requirements may be understood as required physical connections between functionalities.

In an aspect, the step of deriving a set of equipment properties from the laboratory equipment data associated with at least one laboratory equipment device may alternatively, or additionally comprise deriving equipment arrangement. The equipment arrangement may reflect how equipment is arranged. This is in particular useful, when the laboratory equipment data associated with at least one laboratory equipment device refers to list of laboratory equipment that is currently installed and/or configured in a lab. The equipment arrangement may comprise relations to other pieces of equipment.

In an aspect the step of comparing via the processing device the set of experimental requirements with the set of equipment properties, may comprise comparing the arrangement requirements with equipment arrangement. By comparing the arrangement requirements with equipment arrangement additional information is gained. This additional information may be used, for a later setup of the synthesis process according to the synthesis specification.

This is in particular beneficial when the laboratory equipment data associated with at least one laboratory equipment device refers to the list of laboratory equipment that is currently installed and/or configured in a lab. It can then for example be decided to use the installed laboratory equipment without modifications to the arrangement.

In an aspect, providing control data comprises, providing with the processing device control data comprises indicating that the equipment arrangement meets the arrangement requirements or providing with the processing device control data that indicating that that the equipment arrangement is not meeting the arrangement requirements.

The step dependent on the comparison, providing with the processing device control data that indicates that the set of equipment properties from the laboratory equipment data associated with at least one laboratory equipment device meet the set of experimental requirements from the synthesis specification may comprise indicating that the equipment arrangement meets the arrangement requirements or providing with the processing device control data that indicates that the set of equipment properties from the laboratory equipment data associated with at least one laboratory equipment device are not meeting the set of experimental requirements from the synthesis specification may comprise indicating that that the equipment arrangements are not meeting the arrangement requirements.

In an aspect, the step of deriving a set of experimental requirements from the synthesis specification may alternatively, or additionally comprise deriving configuration requirements. Configuration requirements may contain constraints or limitations for the functional capabilities of a piece of equipment. In an example it may make sense to limit a maximum temperature of a heating device to temperatures below 100° C. if the synthesis specification calls for heating water. The configuration requirements may also relate to safety regulations. Especially in chemical industries safety requirements are important.

The step of deriving a set of equipment properties from the laboratory equipment data associated with at least one laboratory equipment device may alternatively, or additionally comprise deriving equipment configuration. The equipment configuration may reflect how equipment is currently configured. This may be boundary conditions a piece of equipment is allowed to provide, e. g. maximal heating rate of maximal temperature of a heating device. This is in particular useful, when the laboratory equipment data associated with at least one laboratory equipment device refers to list of laboratory equipment that is currently installed and/or configured in a lab.

The step of comparing via a processing device the set of experimental requirements with the set of equipment properties, may comprise comparing the equipment configuration with the configuration requirements. When the equipment configurations match the experimental requirements it is considered that the equipment configurations meet the synthesis specification requirements. When the equip configuration deviates from the required configuration it is considered that the experimental requirements are not met.

By comparing the configuration requirements with equipment configurations additional information is gained. This additional information may be used, for a later setup of the synthesis process according to the synthesis specification.

This is beneficial when the laboratory equipment data associated with at least one laboratory equipment device refers to the list of laboratory equipment that is currently installed and/or configured in a lab. It can then for example be decided to use the installed laboratory equipment without modifications to the configuration of pieces of equipment.

In an aspect providing control data comprises, providing with the processing device control data indicating that the equipment configurations meet the configuration requirements or providing with the processing device control data indicating that that the equipment configurations are not meeting the configuration requirements.

The step dependent on the comparison,
providing with the processing device control data that indicates that the set of equipment properties from the laboratory equipment data associated with at least one laboratory equipment device meet the set of experimental requirements from the synthesis specification may comprise indicating that the equipment configurations meet the configuration requirements or
providing with the processing device control data that indicates that the set of equipment properties from the laboratory equipment data associated with at least one laboratory equipment device are not meeting the set of experimental requirements from the synthesis specification may comprise indicating that that the equipment configurations are not meeting the configuration requirements Including the configuration in the method reduces the risk of performing a synthesis process with settings that may violate constraints.

In an aspect providing with the processing device control data indicating that the set of equipment properties from the laboratory equipment data associated with at least one laboratory equipment device meet the set of experimental requirements from the synthesis specification is followed by execution of the experiment based on the control data.

In an aspect, the step dependent on the comparison via an output device providing with the processing device control data that indicates that the set of equipment properties from the laboratory equipment data associated with at least one laboratory equipment device meet the set of experimental requirements from the synthesis specification may be followed by a step of the experiment.

This enables automation of synthesis processes. All requirements necessary for the synthesis process are checked and only upon validation control data is provided that executes the synthesis process.

In an aspect the step of performing the synthesis process may be followed by a classification whether the synthesis process was successful or not.

In an aspect the method may further comprise storing the synthesis specification in a synthesis specification database together with the classification.

Storing the synthesis specification together with the classification whether the synthesis process was successful allows to retrieve the information for later experiments.

In an aspect storing may further comprise a step of storing information that the synthesis process was run with an amended synthesis specification.

Storing the amended synthesis specification together with the classification whether the synthesis process was successful allows to retrieve the information for later experiments.

Storing the information that the synthesis process was run with an amended synthesis specification provides relevant information for future work.

In an aspect storing may further comprise storing the information that the synthesis process was run with an amended laboratory equipment data associated with at least one laboratory equipment device. Storing the amended laboratory equipment data associated with at least one laboratory equipment device together with the classification whether the synthesis process was successful allows to retrieve the information for later experiments. Storing the information that the synthesis process was run with the amended laboratory equipment data associated with at least one laboratory equipment device provides relevant information for future work.

The method may further comprise a step of storing information that the synthesis process was run with human interaction. Storing the information that the synthesis process was run with human interaction provides relevant information for future work.

In an aspect the step of dependent on the comparison, providing with the processing device control data that indicates that the set of equipment properties from the laboratory equipment data associated with at least one laboratory equipment device are not meeting the set of experimental requirements from the synthesis specification may be followed by providing information which experimental requirements are not met.

In an aspect providing control data indicating which experimental requirements are not met comprises providing a list of the function requirements and/or technical requirements that are not met.

In a further aspect providing information which experimental requirements are not met may include providing a list of the functional requirements and/or technical requirements that are not met.

Such a list allows to easily identify what steps of the synthesis process cannot be performed by the equipment in the laboratory equipment data associated with at least one laboratory equipment device.

Additionally, the step of providing a list of the function requirements and/or technical requirements that are not met may comprise quantitative values related to a deviation between the technical requirements and the equipment capabilities.

This additional information allows the experimentalist to amend the synthesis specification such that the experimental requirements are amended and now match the equipment capabilities e.g. when the technical requirements from the synthesis specification call for 150° C. and the available heating device in the laboratory equipment data associated with at least one laboratory equipment device only can provide 140° C., then the synthesis specification may be amended to only require 140° C.

In an aspect the step of dependent on the comparison, providing with the processing device control data that indicates that the set of equipment properties from the laboratory equipment data associated with at least one laboratory equipment device are not meeting the set of experimental requirements from the synthesis specification may be followed by a providing a proposal to change the setup by a. amending the synthesis specification and/or
b. replacing a device with another device that provides the experimental requirements, and/or c. assigning experimental requirements to the experimentalist.

In an aspect the synthesis specification may be amended such that the set of experimental requirements meet the set of equipment properties from the laboratory equipment data associated with at least one laboratory equipment device. In an aspect the amended synthesis specification may be stored in a database.

In an aspect, the amended synthesis specification may then be provided to the processing device as synthesis specification. The method may then proceed again with the steps of deriving and comparing.

This has the advantage, that it is always assessed if all experimental requirements are met before proceeding to the experiment. This greatly improves safety.

The step of amending the synthesis specification may be in particular useful, when the experimental requirements that are not met are close to the equipment functions of the laboratory equipment data associated with at least one laboratory equipment device.

In an aspect the method may further replacing a device from the laboratory equipment data associated with at least one laboratory equipment device that does not meet the experimental requirements and selecting another device that meets the experimental requirements.

In this aspect the method may further comprise amending the laboratory equipment data associated with at least one laboratory equipment device such that the selected device is comprised in amended laboratory equipment data associated with at least one laboratory equipment device.

The method may then further comprise a step of storing the amended laboratory equipment data associated with at least one laboratory equipment device in a database. The method may then further comprise the step of providing the amended laboratory equipment data associated with at least one laboratory equipment device to the processing device as laboratory equipment data associated with at least one laboratory equipment device. The method may then proceed again with the steps of deriving and comparing.

This secures that all experimental requirements are met before performing the experiment.

In an aspect the method may further comprise assigning the experimental requirements that are not met to the experimentalist.

Assigning the functionality requirements that are not met may comprise creating a device in an amended laboratory equipment data associated with at least one laboratory equipment device and storing in the amended laboratory equipment data associated with at least one laboratory equipment device the assigned experimental requirements to that created device.

This allows to perform experiments according to synthesis specifications although no physical equipment is available to perform all required steps in the synthesis specification. The method may then further comprise a step of storing the amended laboratory equipment data associated with at least one laboratory equipment device in a database. The method may then further comprise the step of providing the amended laboratory equipment data associated with at least one laboratory equipment device to the processing device as laboratory equipment data associated with at least one laboratory equipment device. The method may then proceed again with the steps of deriving and comparing.

This secures that all experimental requirements are met before performing the experiment. Optionally, the method may comprise the step of receiving a user input confirming, that the synthesis specification is run in amended form.

In an aspect the step of providing the control data indicating that the that the set of equipment properties and the experimental requirements of the synthesis specification are not met may be followed by the step of providing a list of recommendations for replacing the functionalities and the requirements of the synthesis specification are not met by human interaction. This allows the experimentalist to humanly interact to perform the missing function or support the equipment capabilities, such that the experimental requirements are met.

The method may further comprise providing guidance information regarding what functions have to be performed by human interaction while running the experiment. This allows to manually run experiments and avoids rebuilding the experimental setup for only minor deviations from the synthesis specification requirements.

In an aspect the step of providing the control data indicating that the set of functionalities are not meeting the requirements of the synthesis specification may be followed by the step of suggesting rebuilding the experimental setup. This step may include control data indicating the suggestion to rebuild the experiment. This step may be performed after the step of providing the information which experimental requirements are not met may include providing the list of the function requirements and/or technical requirements that are not met.

The step of suggesting rebuilding may be followed by receiving at the processing device an inventory laboratory equipment data associated with at least one laboratory equipment device.

The inventory ab equipment list may be a list of equipment available in an inventory of the lab.

Alternatively, the inventory laboratory equipment data associated with at least one laboratory equipment device may be list may be a list of equipment available in an inventory list of a company.

The step of providing the inventory laboratory equipment data associated with at least one laboratory equipment device may be followed by a step of deriving a set of inventory equipment properties from the inventory laboratory equipment data associated with at least one laboratory equipment device.

In addition, the method may comprise the step of comparing via the processing device the list of the function requirements and/or technical requirements that are not met with the set of inventory equipment properties from the inventory laboratory equipment data associated with at least one laboratory equipment device.

The method may further comprise the step of deriving a matching equipment list. The matching equipment list contains equipment that provides the function requirements and/or technical requirements that were not met in the provided laboratory equipment data associated with at least one laboratory equipment device.

In particular, the matching laboratory equip list may contain all pieces of equipment that meet the technical and functional requirements of the synthesis specification.

The method may further comprise the step of deriving a matching equipment list may be followed by providing the matching laboratory equip list to a user.

This may be beneficial if more than one piece of equipment meets the functional and technical requirements. The experimentalist may then pick and choose the pieces of equipment from the matching laboratory equip list. The matching laboratory equip list may be in alphabetical order. In other examples the matching laboratory equipment data associated with at least one laboratory equipment device may be ordered according to an availability of the equipment or the number of devices in the matching laboratory equipment data associated with at least one laboratory equipment device. In other examples the matching laboratory equip list may be ordered according to the physical distance of the equip from the lab.

The step of providing the matching laboratory equip list to a experimentalist may be followed by a step of selecting equipment from the matching laboratory equipment data associated with at least one laboratory equipment device.

The step of selecting equipment from the matching laboratory equipment data associated with at least one laboratory equipment device may be followed by a step of requesting the experimentalist to confirm that the experimental setup has been changed according the selected equipment from the matching laboratory equipment data associated with at least one laboratory equipment device.

Upon confirmation that the experimental setup hast ben changed according to the selected equipment from the matching laboratory equipment data associated with at least one laboratory equipment device a new laboratory equipment data associated with at least one laboratory equipment device is generated.

The method may then be performed with the amended laboratory equipment data associated with at least one laboratory equipment device. This may be repeated until all experimental requirements from the synthesis specification are met.

In a further aspect providing information which experimental requirements are not met may include providing a list of the configuration requirements are not met.

Additionally, the step of providing a list of the configuration requirements are not met may be followed by providing an instruction of changing the equipment configuration according to the configuration requirements.

This raises awareness to the experimentalist that not all configuration requirements are met and provides support in preparing the experiment. This can increase safety.

In an alternative, the processing device may be configured for adapting the equipment configuration according to the configuration requirements via a programming interface.

This further supports the experimentalist and therefore can further increase safety.

In a further aspect providing information which experimental requirements are not met may include providing a list of the arrangement requirements are not met.

Additionally, the step of providing a list of the arrangement requirements are not met may be followed by providing a suggestion of changing the equipment arrangement according to the arrangement requirements.

This raises awareness to the experimentalist that not all arrangement requirements are met and provides support in preparing the experiment. This can increase safety.

Changing the equipment arrangement is a manual process. A further step of receiving experimentalist confirmation that the equipment arrangement has been changed may be following the step of providing the suggestion of changing the equipment arrangement according to the arrangement requirements.

This further supports the experimentalist and therefore can increase safety.

Alternatively, or additionally configuring may comprise providing a virtual representation of the functionalities to the user. The virtual representation of the functionalities may be arranged in the order of a process flow in the synthesis specification.

The step of configuring may further comprise defining for each functionality the technical requirements from the synthesis specification.

In an aspect, providing with the processing device control data that indicates that the set of equipment properties from the laboratory equipment data associated with at least one laboratory equipment device are not meeting the set of experimental requirements from the synthesis specification may further comprise, providing a warning, when the deviation between technical requirements and equipment function capabilities are within a threshold. This may allow to proceed without amending the synthesis specification and/or the laboratory equipment data associated with at least one laboratory equipment device.

According to an aspect, a computer program or a computer program product or computer readable non-volatile storage medium comprising computer readable instructions, which when loaded and executed by a processing device perform the methods disclosed herein. According to an aspect a system is proposed, the system comprising an input device, and output device and a processing device configured for performing the method disclosed herein.

In a perspective a system for controlling a synthesis process for a chemical or biological product comprising, at least one laboratory equipment device, and a synthesis specification control module with an input interface, an output interface and a processing device configured to perform the method steps of the method of controlling as disclosed herein is proposed.

The disclosure applies to the systems, methods, computer programs, computer readable non-volatile storage media, computer program products disclosed herein alike. Therefore, no differentiation is made between systems, methods, computer programs, computer readable non-volatile storage media or computer program products. All features are disclosed in connection with the systems, methods, computer programs, computer readable non-volatile storage media, and computer program products disclosed herein.

FIGURE DESCRIPTION

Figure 2:
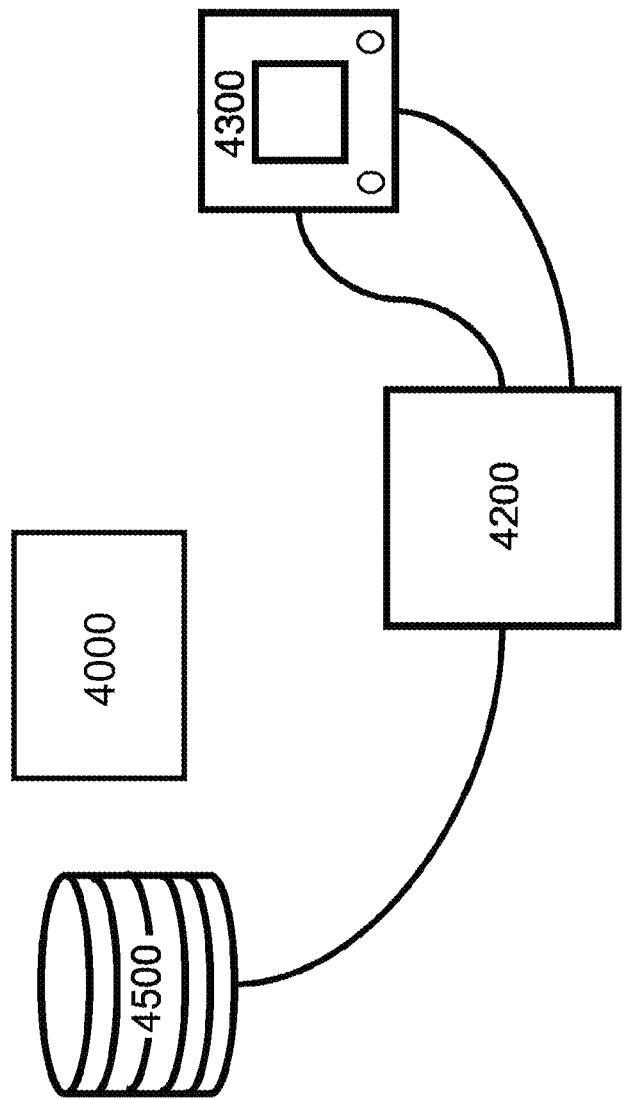
Figure 3:
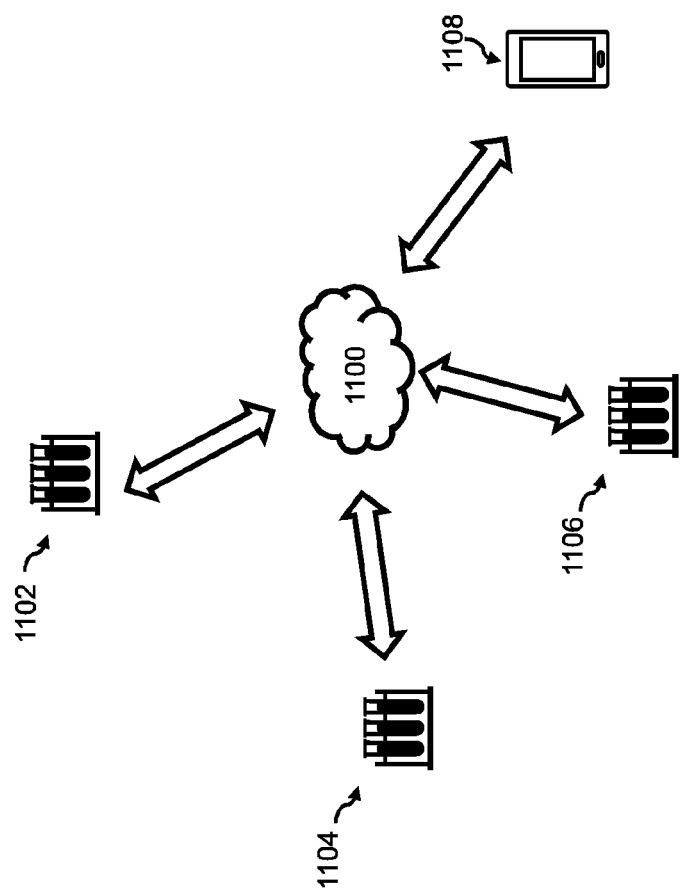
Figure 4:
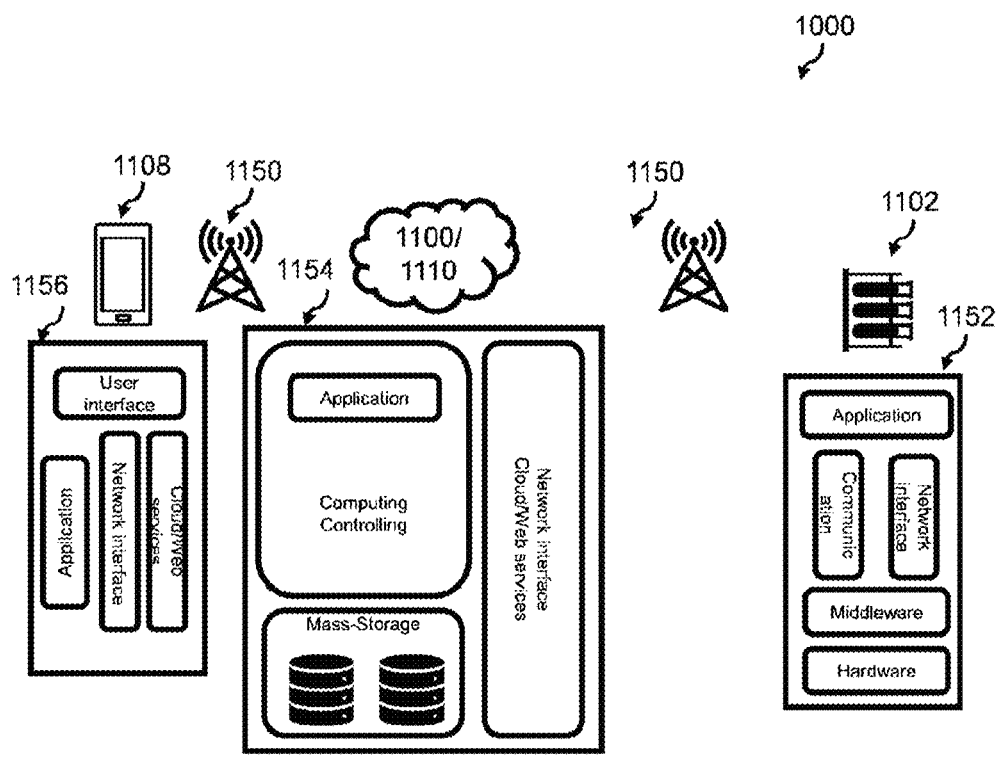
Figure 5:
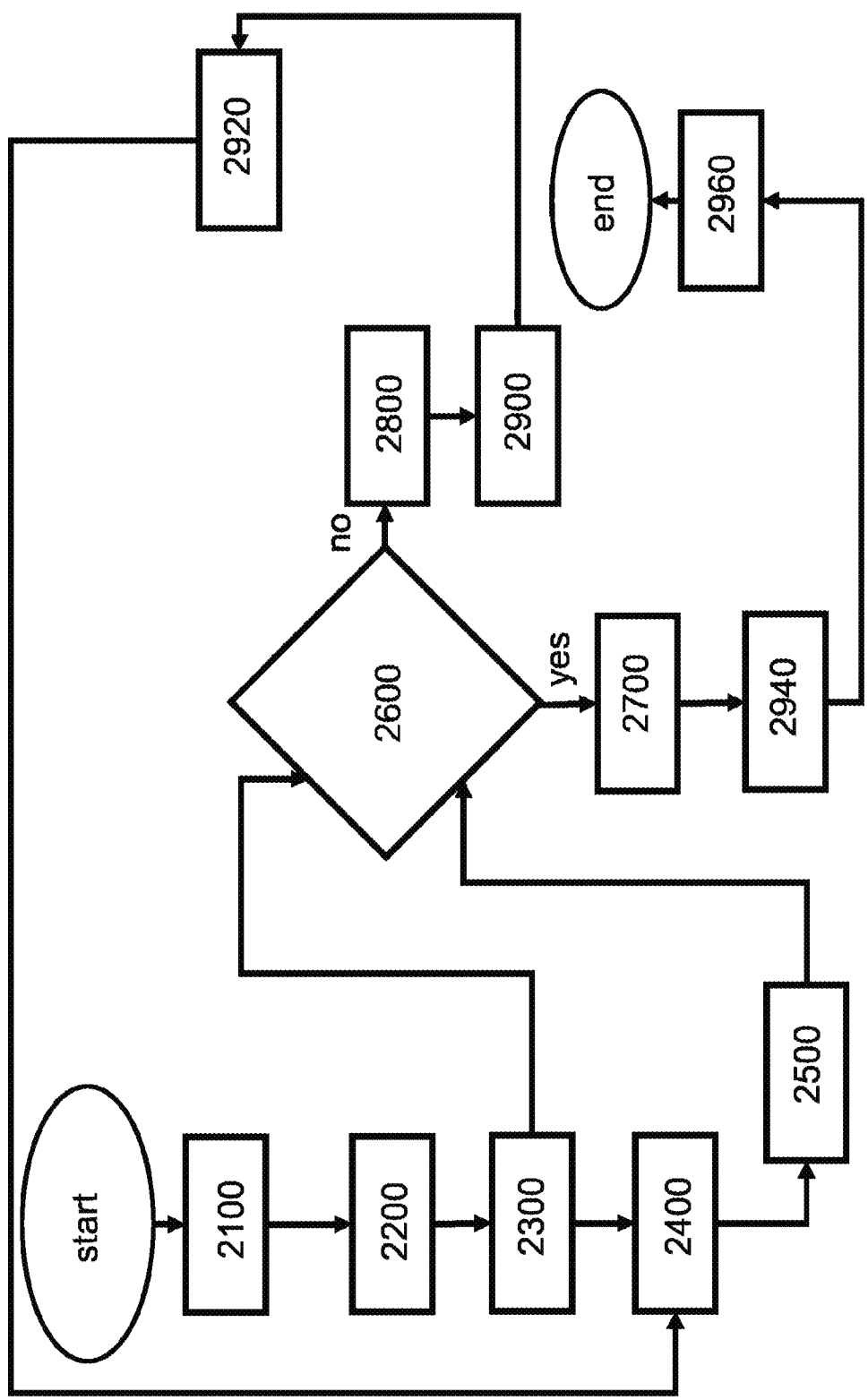

FIG. 1 shows a flow diagram of the disclosed method.
FIG. 2 shows a schematic view of a system for performing the method.
FIG. 3 illustrates an exemplarily embodiment of a system with multiple laboratory equipment devices.
FIG. 4 illustrates a block diagram of an exemplarily system architecture of an automated laboratory.
FIG. 5 illustrates an exemplary workflow of a system for controlling a synthesis process.

DETAILED DESCRIPTION

In an example the synthesis specification may be a synthesis specification for synthesis of fatty acid alkyl ester presented below. Provide 250 g of a fatty acid are heated to 60° C. in a round bottom flask equipped with a magnetic stirring bar. After 15 minutes the fatty acid is molten, and the resulting mixture is stirred for 15 minutes with 100 rpm. 200 ml of this molten fatty acid and 20 ml hydrochloric acid are then transferred with two separate dosing pumps within 10 minutes into a preheated reactor (60° C.) equipped with a distillation bridge and an anchor stirrer set to 200 rpm. Then, the reaction temperature is increased to 140° C. and a total amount of 480 ml of ethyl alcohol is dosed into the resulting reaction mixture over 240 minutes. Excess of alcohol and reaction water are constantly distilled off. The reaction mixture is stirred with 200 rpm at 140° C. for additional 120 minutes. After that the reaction mixture is cooled down to room temperature (20° C.) within 20 minutes to yield the desired fatty acid alkyl ester.

In this example the synthesis specification provided in form of a JSON type file.
Ingredients:
Ingredient I
  Fatty acid
  Amount: 250 g
Ingredient II
  Hydrochloric acid
  Amount: 20 ml
Ingredient III
  Ethyl alcohol
  Amount: 480 ml
Functions:
Containing:
Container I
  Type: round bottom flask
  Min volume: 300 ml
  Max volume: >300 ml
  Configured: Filled with Ingredient I
  Connected to: Dosing pump I/arrangement requirement
Container II
  Type: flask
  Min volume: 25 ml
  Max volume: >25 ml
  Configured:
    Filled with: Ingredient II
  Arrangement:
    Connected to: Dosing pump II
Container III
  Type: flask
  Min volume: 500 ml
  Max volume: >500 ml
  Configured:
    Filled with: Ingredient III
  Arrangement:
    Connected to: Dosing pump III
Container IV
  Type: Reactor
  Min volume: 750 ml
  Max volume: >750 ml
  Filled with: Ingredient I
    Ingredient II
    Ingredient III
    Product
  Arrangement:
    Connected to: Dosing pump I
      Dosing pump II
      Dosing pump III
Heating:
Heater I:
  Type: irrelevant
  Min. temperature: 60° C.
  Max temperature: >=60° C.
  Arrangement:
    Connected to: Container I
  Configuration:
    Temperature limit: 70° C./avoid overheating/
Heater II:
  Type: irrelevant
  Min. temperature: 140° C.
  Max temperature: >=140° C.
  Arrangement:
    Connected to: Reactor I
  Configuration:
    Temperature limit: 150° C./avoid overheating/
Mixing:
Mixer I:
  Type: magnetic stirrer
  Min RPM: 100
  Max RPM: >=100
  Arrangement:
    connected to: Container I
  Configuration:
    RPM limit: 105/avoids spilling/
Mixer II:
  Type: anchor stirrer
  Min RPM: 200
  Max RPM: >=200
  Arrangement:
    connected to: Reactor I
  Configured:
    RPM limit: 210/avoids spilling/
Dosing:
Dosing Pump I:
  Type: irrelevant
  Min dosing rate: <=20 ml/min
  Max dosing rate >=20 ml/min
  Arrangement:
    Connected:
      Input to container I
      Output to container IV
  Configuration:
    dosing limit: 25/avoids spilling/
Dosing Pump II:
  Type: irrelevant
  Min dosing rate: <=2 ml/min
  Max dosing rate >=2 ml/min
  Arrangement:
    Connected:

Input to container II
   Output to container IV
  Configuration:
   dosing limit: 2,5/avoids spilling/
Dosing Pump II:
 Type: irrelevant
 Min dosing rate: <=20 ml/min
 Max dosing rate >=20 ml/min
 Arrangement:
  Connected:
   Input to container III
   Output to container IV
  Configuration:
   dosing limit: 2,5/avoids spilling/
 Communication:
  Type: none required
Distillation Bridge:
 Type: N/A
 Arrangement:
  Connected:
   Input to container IV
  The procedure of the synthesis process may be provided in form of a time-table inside the JSON type file, see below:

TABLE 1

| Time [hh:mm:ss] | Temp. 1 [° C.] | Mixing 1 [rpm] | Temp. 2 [° C.] | Mixing 2 [rpm] | Dosing 1 [ml/min] | Volume 1 [ml] | Dosing 2 [ml/min] | Volume 2 [ml] | Dosing 3 [ml/min] | Volume 3 [ml] | Total. Volume |
|---|---|---|---|---|---|---|---|---|---|---|---|
| 00:15:00 | 60 | 0 | 20 | 0 | 0 | 0 | 0 | 0 | 0 | 0 | 0 |
| 00:15:00 | 60 | 100 | 60 | 0 | 0 | 0 | 0 | 0 | 0 | 0 | 0 |
| 00:10:00 | 60 | 100 | 140 | 200 | 20 | 200 | 2 | 20 | 0 | 0 | 220 |
| 04:00:00 | 20 | 0 | 140 | 200 | 0 | 0 | 0 | 0 | 2 | 480 | 480 |
| 02:00:00 | 20 | 0 | 140 | 200 | 0 | 0 | 0 | 0 | 0 | 0 | 0 |
| 00:20:00 | 20 | 0 | 20 | 50 | 0 | 0 | 0 | 0 | 0 | 0 | 0 |
| Max 07:00 | 60 | 100 | 140 | 200 | 20 | 200 | 2 | 20 | 2 | 480 | 700 |
| Min. 00:00 | 20 | 0 | 20 | 0 | 0 | 0 | 0 | 0 | 0 | 0 | 0 |

Providing the synthesis specification in a json type format allows to easily derive the experimental requirements by parsing. In this example only obvious requirements and functionalities are shown for illustration purposes. The list of technical requirements in the synthesis specification may be more detailed. In another example viscosity of fluids in the reaction may be provided, in that case it is beneficial if the torque needed for stirring the viscose fluid is provided as a technical requirement.

The list of laboratory equipment is also only for illustration. More technical capabilities may be provided as well. In case where a viscosity is given in the synthesis specification, the technical capabilities may provide information on the available torque of a mixer may also be provided.

In this example the laboratory equipment data associated with at least one laboratory equipment device is also be provided in form of a JSON type file. In other examples other formats of providing the laboratory equipment data associated with at least one laboratory equipment device are also envisioned.

Laboratory equipment data associated with at least one laboratory equipment device:
Device Name: IKA C-MAG HS 7
 Device functionality:
 Heating
  Type: heating plate
   Heating power: 1000 W
   Units: ° C.
   Heating Range:
    min temperature: room temperature
    max temperature: 500° C.
   Setting range:
    min temperature: 0° C.
    max temperature: 500° C.
    setting accuracy: 5° C.
   Configuration:
    Temperature limit: 70° C.
  Mixing:
   Type: magnetic stirrer
    Min RPM: 50
    Max RPM: 1500
   Configured:
    RPM limit 110
  Arrangement: N/A
Device Name: Heidolph Hei-Connect
 Device functionality:
 Heating
  Type: heating plate
   Heating power: 800 W
   Units: ° C.
   Heating Range:
    min temperature: 20° C.
    max temperature: 300° C.
   Setting range:
    min temperature: 20° C.
    max temperature: 300° C.
    setting accuracy: 1° C.
   Configuration:
    N/A
  Mixing:
   Type: magnetic stirrer
    Min RPM: 100
    Max RPM: 1400
Device Name: Lauda Pro P2E
 Device functionality:
 Heating
  Type: thermostat
   Heating power: 2500 W
   Units: ° C.
   Heating Range:
    min temperature: 80° C.
    max temperature: 250° C.
   Setting range:
    min temperature: 80° C.
    max temperature: 250° C.
    setting accuracy: 0,05° C.
   Configuration:
    N/A
  Mixing:
Device Name: Heidolph Hei-TORQUE Precision 100
 Device functionality:

Mixing
　Type: anchor stirrer
　Min RPM: 10
　Max RPM: 2000
　Max Torque: 100 Ncm
　Max Viscosity: 60000 mPa
　Max Volume: 50 l
　Arrangement:
　　N/A
　Configuration:
　　RPM limit: N/A
Device Name: IKA EUROSTAR 100 Control
　Device functionality:
　Mixing
　　Type: anchor stirrer
　　Min RPM: 0
　　Max RPM: 1300
　　Max Torque: 100 Ncm
　　Max Viscosity: 70000 mPa
　　Max Volume: 100 l
　　Arrangement:
　　　N/A
　　Configuration:
　　　RPM limit: N/A
Device Name: IKA EUROSTAR 7.5 Digital
　Device functionality:
　Mixing
　　Type: anchor stirrer
　　Min RPM: 50
　　Max RPM: 2000
　　Max Torque: 7.5 Ncm
　　Max Viscosity: 4000 mPa
　　Max Volume: 5 l
　　Arrangement:
　　　N/A
　　Configuration:
　　　RPM limit: N/A
Dosing:
Device Name: KNF Simdos02
　Device functionality:
　Dosing
　　Type:
　　Min dosing rate: 0,0003
　　Max dosing rate 0,02 l/min
　　Max pressure: 6 bar
　　Arrangement:
　　　Connected:
　　　　N/A
　　Configuration:
　　　N/A
Device Name: KNF Simdos10
　evice functionality:
　Dosing
　　Type:
　　Min dosing rate: 0.001
　　Max dosing rate 0.1 l/min
　　Max pressure: 6 bar
　　Arrangement:
　　　Connected:
　　　　N/A
　　Configuration:
　　　N/A
Device Name: ISMATEC Reglo ICC
　Device functionality:
　Dosing
　　Type:
　　Min dosing rate: 0.001 ml/min
　　Max dosing rate 35 ml/min
　　Max pressure: 1 bar
　　Arrangement:
　　　Connected:
　　　　N/A
　　Configuration:
　　　N/A In FIG. 1 an example of a workflow according to the invention is shown.

At step 100 the synthesis specification for synthesis of fatty acid alkyl esther is received at the processor 4200 shown in FIG. 2. In this example the synthesis specification has the JSON like structure as presented above.

In this example, the synthesis specification is provided from a database 4500. In an alternative, the synthesis specification may also be provided by input/output device 4300.

At step 200 the set of experimental requirements is derived from the synthesis specification. In this example the step of deriving comprises the step of deriving functional requirements from the synthesis specification. Deriving is performed by parsing the JSON type synthesis specification file with processor 4200. In this example, the functional requirements call for the following functional requirements: Containing: 4×; Heating: 2×; Mixing: 2×; Dosing: 3×.

In an alternative, the required ingredients may also be provided as functional requirements. Providing the ingredients allows to provide an additional check list that the experimentalist may have to approve, whether the ingredients are available for the experiment.

The step of deriving a set of experimental requirements from the synthesis specification further comprises, deriving a set of technical requirements from the synthesis specification. As an example, the technical requirements from heater I, which is used for melting the fatty acid are discussed in more detail. The technical requirements for the synthesis specification do not call for a specific type of a heater and a minimum temperature of 60° C. needs to be reached. The configuration requires an upper limit of 70° C. to prevent overheating.

The step of deriving a set of experimental requirements from the synthesis specification further comprises,
　deriving a set of experimental requirements from the synthesis specification comprises deriving arrangement requirements, and
　deriving configuration requirements.
synthesis specification also provides requirements regarding arrangement of the experimental setup.

This is beneficial as it allows to provide the experimentalist with guidance how to setup the layout of the experiment.

At step 300 a laboratory equipment data associated with at least one laboratory equipment device is received at the processing device via the input device. In this example the input device may be the database 4500.

At step 400, the set of equipment properties from the laboratory equipment data associated with at least one laboratory equipment device is derived by processor 4200. In this example, the step of deriving a set of equipment properties from the laboratory equipment data associated with at least one laboratory equipment device comprises deriving a set of equipment functions from the laboratory equipment data associated with at least one laboratory equipment device and deriving a set of equipment function capabilities from the laboratory equipment data associated with at least one laboratory equipment device. In this example the laboratory equipment data associated with at least one laboratory equipment device contains information what devices are currently installed and setup in the in the laboratory. In this example the 3 heating devices are available in the laboratory equipment data associated with at least one laboratory equipment device.

In this example, the step of deriving a set of equipment properties from the laboratory equipment data associated with at least one laboratory equipment device further comprises
deriving equipment arrangement and
deriving equipment configuration.

Step 500 comparing via the processing device the set of experimental requirements with the set of equipment properties, comprises in this example comparing the set of functional requirements with the set of equipment functions and comparing the set of technical requirements with the set of equipment function capabilities. From, the laboratory equipment data associated with at least one laboratory equipment device three heating devices are derived as being present. Therefore, the step of comparing the set of functional requirements with the set of equipment functions returns that the functionalities are met with respect to the first heating functionality. The step of comparing the set of technical requirements with the set of equipment function capabilities returns, that heater 3 "Lauda Pro P2E" does not meet the technical requirements, because the minimum temperature is 80° C.

The step 500 of comparing via the processing device the set of experimental requirements with the set of equipment properties, in this example further comprises comparing
the arrangement requirements with the equipment arrangement and
the equipment configuration with the configuration requirements.

The step of comparing the equipment configuration with the configuration requirements returns, that heater 1 "IKA C-MAG HS 7" already meets the configuration requirement of a temperature limit of 70° C.

The step of comparing the arrangement requirements with the equipment arrangement returns that none of the heaters meet the requirements, in this example none of the heaters comprise information on the arrangement.

In this example at step 800 providing with the processing device control data that indicates that the set of equipment properties from the laboratory equipment data associated with at least one laboratory equipment device are not meeting the set of experimental requirements from the synthesis specification is provided with the processing device.

In this example the control data is provided to the input/output device 4300.

Step 800 further comprises providing information which experimental requirements are not met. In this case the information contains a list of the function requirements and/or technical requirements that are not met, here that the arrangement requirements of Heater 1 are not met.

Step 900 comprises providing an instruction of changing the equipment configuration according to the configuration requirements.

At step 920, the experimentalist changes the configuration of the equipment and an amended laboratory equipment data associated with at least one laboratory equipment device is stored in database 4500. The amended laboratory equipment data associated with at least one laboratory equipment device is then provided as laboratory equipment data associated with at least one laboratory equipment device to the processing device. And the method starts again at step 400.

Now the step of comparing via the processing device the set of experimental requirements with the set of equipment properties returns that the set of equipment properties from the laboratory equipment data associated with at least one laboratory equipment device meet the set of experimental requirements from the synthesis specification. At step 600 control data that indicates that the set of equipment properties from the laboratory equipment data associated with at least one laboratory equipment device meet the set of experimental requirements from the synthesis specification is provided to the input/output device, which in this example is a touchpad.

At step 700 the synthesis process is executed. In an optional setting guiding information is provided. The guiding information guiding the experimentalist through the steps of the synthesis specification.

At step 940, it is classified, if the synthesis process was successful or not.

At step 960 the synthesis specification is stored in the database 4500 with the classifier, whether the synthesis process was successful or not. In this example, the laboratory equipment data associated with at least one laboratory equipment device used for performing the synthesis process is also stored in the database 450.

Although the example above only explicitly describes the workflow in relation to one heating device. It is clear that in general the method may be performed for all functionalities and technical requirement of the synthesis specification.

An example of a system 4000 suitable for performing the above laid out method is shown in FIG. 2. A processing device 4200 is configured for performing the method steps laid out. Database 4500 provides the synthesis specification to the processing device. In this example, the database 4500 also provides the laboratory equipment data associated with at least one laboratory equipment device. In other examples, more than one database may be used, in particular the laboratory equipment data associated with at least one laboratory equipment device may be in another data base than the synthesis specification database. The processing device in this example is a server and an input/output interface 4300 is a touchpad comprising a touchscreen.

FIG. 3 illustrates an exemplarily embodiment of a system with multiple laboratory equipment devices.

The system of FIG. 3 shows the distributed system including multiple laboratory equipment devices 1102, 1104, 1106, a synthesis specification control module 1100, one or more user device(s) 1108. The laboratory equipment devices 1102, 1104, 1106 may transmit data signals collected from various sensors and actors. Such data may include, actor settings, sensor data setpoints, deviations from setpoints and/or operation data, such as initial operation data, updated operation data or current operation data.

The synthesis specification control module 1100 may be a server-based distributed computing environment for storing and computing data on multiple cloud servers accessible over the Internet. The synthesis specification control module may also be a processing device with input and output interfaces.

The laboratory equipment devices 1102, 1104, 1106 may share data signals with the user device(s) 1108 via the synthesis specification control module 1100. Communication channels between and communication channels, between the user device(s) 1108, the laboratory equipment devices 1102, 1104, 1106 and the synthesis specification control module 1100 may be established through a wired or a wireless communication protocol. A wireless local area network (WLAN), e.g. Wireless Fidelity (Wi-Fi), may be established.

The first laboratory equipment device 102 may be configured to perform a first function in the synthesis specification process and the second laboratory equipment device 104 may be configured to perform a second function in the synthesis specification.

The first function may be pumping of an ingredient of the synthesis specification into a reactor and the second and the second function may be heating the ingredient.

FIG. 4 illustrates a block diagram of an exemplarily system architecture of an automated laboratory system 1000 for controlling a synthesizing process with a laboratory equipment device 1102, a network 1150, a synthesis specification control module 1100, and a client device 1108.

The automated laboratory system includes a laboratory equipment device layer 1152 as part of the laboratory equipment device 1102 as well as a synthesis specification control module layer 1154 associated with the synthesis specification control module 1100 and a remote control or client layer 1156 associated with the client device 1108.

The laboratory equipment device layer 1152 may be split into several hierarchical layers: a hardware, a middleware and an interface layer. The hardware layer relates to hardware resources such as sensors and actuators, in particular for controlling a synthesis process. The middleware relates to any of the known middleware for laboratory or plant synthesis operations. One example is LABS/QM, providing different abstractions to hardware, network and operating system such as low-level device control and message passing. A communication layer relates to communication protocols one the protocol may be REST, which may be implemented over different transport protocols (i.e. UDP, TCP, Telemetry) that allow the exchange of messages between the laboratory equipment control module and laboratory equipment devices. Such messages may comprise e.g. equipment property data associated with the laboratory equipment device, e.g. equipment configuration data, equipment function data, equipment function capability data, equipment arrangement data. Such software architecture allows to control and monitor laboratory equipment devices without having to interact with the hardware. An additional application layer allows to change the equipment configuration of the laboratory equipment device. The application layer also allows actuating the actuators according to control data provided by the synthesis specification control module. The synthesis specification control module layer 1154 may include: a mass storage layer, a computing layer, an interface layer. The storage layer is configured to provide mass storage for the synthesis specifications. The storage layer is further configured to receive mass storage for streams of data provided from the laboratory equipment device. Each laboratory equipment device may be configured to stream e.g. operation data, sensor data, status data in real time. The storage layer is further configured to store the laboratory equipment property data, provided by the laboratory equipment devices. The laboratory equipment devices may be configured to provide the equipment property data via the network interface to the synthesis specification control module. Such data may be stored in structured databases such as SQL databases or in a distributed file system such as HDFS, NoSQL databases such as HBase, MongoDB. The synthesis specification control module layer may comprise an application layer. In case the synthesis specification control module is deployed on a cloud service, the computing layer the application layer that allows to customize functionalities provided by standard cloud services to perform computing processes. The application layer may be configured to perform computing processes based on e.g. the synthesis specification, the laboratory equipment property data, inputs received from the client device.

Such computing processes may include a) streaming of sensor data provided by the laboratory equipment device 1102, b) analyzing laboratory equipment property data provided by the laboratory equipment device 1102, c) determining or generating operation data for the laboratory equipment device 1102, d) updating operation data for the laboratory equipment device 1102, e) providing initial operation data for the laboratory equipment device 1102, f) determining operation data based on the sensor data. Such applications may require real-time application processing when new events are detected and may require the dynamic readjustment of control data to ensure the optimality of the synthesis.

The interface layer may implement web services, network interfaces such as UDP or TCP or Websocket interfaces. Such interfaces may enable listening to JSON type serialized messages sent from laboratory equipment device 1102 and to handle streaming applications. While network interfaces (UDP or TCP) may be used to handle continuous streams, web services may be used for sending control commands to the laboratory equipment device 1102 and getting information from the laboratory equipment device or from the client device.

FIG. 5 illustrates an exemplary workflow of a system for controlling a synthesis process In a first step 2100 a synthesis specification for a synthesis process is selected via the client device 1108. Upon selection the synthesis specification is received 2200 via an input interface at the processing device of the synthesis specification control module. For this the client device may connect to the specification control module. The input interface of the synthesis control module may be the network interface described with respect to FIG. 4. Selection of the synthesis specification may comprise entering a synthesis specification on the client device or selecting a synthesis specification stored in the mass storage device of the synthesis specification control module. At step 2300 deriving a set of experimental requirements from the synthesis specification. At step 2400 the synthesis specification control module may request laboratory equipment data from at least one. This request may be performed by broadcasting to all connected laboratory equipment devices, iteratively addressing each connected laboratory equipment device or by fetching a list comprising the data associated with the at least one laboratory equipment device from a data base. Upon receiving the laboratory equipment data at step 2400, the laboratory equipment data may be aggregated e. g. in a json type format. In a next step 2500, a set of equipment properties from the laboratory equipment data associated with at least one laboratory equipment device is derived. At step 2600 the step of comparing via the processing device the set of experimental requirements with the set of equipment properties, comprises in this example comparing the set of functional requirements with the set of equipment functions and comparing the set of technical requirements with the set of equipment function capabilities. From, the laboratory equipment data associated with at least one laboratory equipment device three heating devices are derived as being present. Therefore, the step of comparing the set of functional requirements with the set of equipment functions returns that the functionalities are met with respect to the first heating functionality. The step of comparing the set of technical requirements with the set of equipment function capabilities returns, that heater 3 "Lauda Pro P2E" does not meet the technical requirements, because the minimum temperature is 80° C.

The step 2600 of comparing via the processing device the set of experimental requirements with the set of equipment properties, in this example further comprises comparing
the arrangement requirements with the equipment arrangement and
the equipment configuration with the configuration requirements.

The step of comparing the equipment configuration with the configuration requirements returns, that heater 1 "IKA C-MAG HS 7" already meets the configuration requirement of a temperature limit of 70° C.

The step of comparing the arrangement requirements with the equipment arrangement returns that none of the heaters meet the requirements, in this example none of the heaters comprises information on the arrangement.

In this example at step 2800 providing with the processing device control data that indicates that the set of equipment properties from the laboratory equipment data associated with at least one laboratory equipment device are not meeting the set of experimental requirements from the synthesis specification is provided with the processing device.

In this example the control data is provided to the input/output device 4300.

Step 2800 further comprises providing information which experimental requirements are not met. In this case the information contains a list of the function requirements and/or technical requirements that are not met, here that the arrangement requirements of Heater 1 are not met.

At step 2900 the control data comprising updated configuration data according to the configuration requirements for the lab equipment device are provided to the lab equipment device not meeting the requirements. This may need to be confirmed upon verification.

At step 2920, the configuration of the laboratory equipment device is changed according to the updating information. The method continues at step 2400 and an amended laboratory equipment data associated with at least one laboratory equipment device is provided upon request 2400. At step 2500 a new set of equipment properties from the laboratory equipment data associated with at least one laboratory equipment device is derived.

Now the step of comparing via the processing device the set of experimental requirements with the set of equipment properties provides that control data indicating that the set of equipment properties from the laboratory equipment data associated with at least one laboratory equipment device meet the set of experimental requirements from the synthesis specification. At step 2600 control data that indicates that the set of equipment properties from the laboratory equipment data associated with at least one laboratory equipment device meet the set of experimental requirements from the synthesis specification is provided to the input/output device. The control signal may comprise data suitable for performing the synthesis process by.

At step at 2700 the synthesis process is performed. In an optional setting guiding information is provided. The guiding information guiding the experimentalist through the steps of the synthesis specification.

At step 2940, it is classified, if the for a synthesis process was successful or not.

At step 2960 the synthesis specification is stored in the database 4500 with the classifier, whether the synthesis process was successful or not. In this example, the laboratory equipment data associated with at least one laboratory equipment device used for performing the synthesis process is also stored in the database 4500.

The invention claimed is:

1. A computer implemented method for controlling a synthesis process for a chemical or biological product, comprising the steps of
at a processing device of a synthesis specification control module
receiving via a communication interface a synthesis specification for the synthesis process,
deriving a set of experimental requirements from the synthesis specification,
receiving via the communication interface device laboratory equipment data associated with at least one laboratory equipment device,
deriving a set of equipment properties from the laboratory equipment data associated with at least one laboratory equipment device,
comparing the set of experimental requirements with the set of equipment properties;
generating control data based on the comparison; and
providing with the processing device the control data suitable for controlling and/or monitoring the synthesis process.

2. The method of claim 1, further comprising the step of requesting the laboratory equipment data associated with the at least one laboratory equipment device from said at least one laboratory equipment device.

3. The method of claim 1, further comprising the step of selecting a synthesis specification from stored preconfigured synthesis specifications.

4. The method of claim 1, wherein providing the control data comprises providing control data indicating that the set of equipment properties meet the set of experimental requirements from the synthesis specification, or providing control data indicating that the set of equipment properties does not meet the set of experimental requirements from the synthesis specification.

5. The method of claim 4, wherein the step of deriving the set of experimental requirements from the synthesis specification, comprises:
deriving a set of functional requirements from the synthesis specification,
deriving a set of technical requirements from the synthesis specification and the step of deriving a set of equipment properties from the laboratory equipment data associated with the at least one laboratory equipment device, comprises
deriving a set of equipment functions from the laboratory equipment data associated with at least one laboratory equipment device,
deriving a set of equipment function capabilities from the laboratory equipment data associated with at least one laboratory equipment device,
and the step of comparing via the processing device the set of experimental requirements with the set of equipment properties, comprises
comparing the set of functional requirements with the set of equipment functions and
comparing the set of technical requirements with the set of equipment function capabilities and,
wherein providing control data comprises
providing control data indicating that the set of equipment functions meet the set of functional requirements, and the set of equipment function capabilities meet the set of technical requirements or providing with the processing device control data indicating that the set of equipment functions are not meeting the set of functional requirements, and/or the set of equipment function capabilities are not meeting the set of technical requirements.

6. The method of claim 4, wherein the step of deriving a set of experimental requirements from the synthesis specification comprises deriving arrangement requirements and the step of deriving a set of equipment properties from the laboratory equipment data associated with at least one laboratory equipment device, comprises deriving equipment arrangement, and the step of comparing via the processing device the set of experimental requirements with the set of equipment properties, comprises comparing the arrangement requirements with equipment arrangement and, wherein providing control data comprises, providing with the processing device control data comprises indicating that the equipment arrangement meets the arrangement requirements or providing with the processing device control data that indicating that that the equipment arrangement is not meeting the arrangement requirements.

7. The method of claim 4, wherein the step of deriving a set of experimental requirements from the synthesis specification comprises deriving configuration requirements and the step of deriving a set of equipment properties from the laboratory equipment data associated with at least one laboratory equipment device comprises deriving equipment configuration and the step of comparing via a processing device the set of experimental requirements with the set of equipment properties, comprises comparing the equipment configuration with the configuration requirements and, wherein providing control data comprises, providing with the processing device control data indicating that the equipment configurations meet the configuration requirements or providing with the processing device control data indicating that that the equipment configurations are not meeting the configuration requirements.

8. The method of claim 4, wherein the step providing with the processing device control data indicating that the set of equipment properties from the laboratory equipment data associated with at least one laboratory equipment device meet the set of experimental requirements from the synthesis specification is followed by execution of the experiment based on the control data.

9. The method of claim 8, wherein the step of execution of the synthesis process is followed by a classification whether the synthesis process was successful or not.

10. The method of claim 8, wherein the method further comprises storing the synthesis specification in a synthesis specification database together with the classification.

11. The method of claim 10, further comprising the step of storing the laboratory equipment data associated with at least one laboratory equipment device in the synthesis specification database together with the synthesis specification.

12. The method of claim 1, wherein providing control data indicating which experimental requirements are not met comprises providing a list of the function requirements and/or technical requirements that are not met.

13. The method of claim 12, wherein the step of providing a list of the configuration requirements are not met is followed by providing an instruction of changing the equipment configuration according to the configuration requirements.

14. The method of claim 1, further comprising the step of providing a proposal to change the setup by
   a. amending the synthesis specification and/or
   b. replacing a device with another device that provides the experimental requirements, and/or
   c. assigning experimental requirements to the experimentalist.

15. The method of claim 1, further comprising the steps of
   a. amending the synthesis specification such that the set of experimental requirements meet the set of equipment properties from the laboratory equipment data associated with at least one laboratory equipment device and/or;
   b. selecting another device that meets the experimental requirements and amending the laboratory equipment data associated with at least one laboratory equipment device; and/or
   c. assigning the experimental requirements that are not met to the experimentalist and amending the laboratory equipment data of the at least one laboratory equipment device.

16. The method of claim 1, further comprising providing the amended synthesis specification and/or the amended laboratory equipment data associated with at least one laboratory equipment device.

17. A system for controlling a synthesis process for a chemical or biological product comprising, at least one laboratory equipment device, and a synthesis specification control module with an input interface, an output interface and a processing device configured to perform the method steps of claim 1.

18. A computer program product that when executed on a processing device performs the method steps of claim 1.

* * * * *